United States Patent [19]

Klose

[11] 4,333,788

[45] Jun. 8, 1982

[54] TIRE BUILDING MACHINE SERVICER

[75] Inventor: Karl W. Klose, Findlay, Ohio

[73] Assignee: Cooper Tire & Rubber Company, Findlay, Ohio

[21] Appl. No.: 137,556

[22] Filed: Apr. 4, 1980

[51] Int. Cl.³ .......................................... B29H 17/20
[52] U.S. Cl. .............................. 156/405 R; 156/406; 193/35 TE; 226/120; 226/199
[58] Field of Search ............ 156/394 R, 405 R, 406; 193/35 C, 35 TE, 37; 226/120, 127, 196, 199

[56] References Cited

U.S. PATENT DOCUMENTS

| | | | |
|---|---|---|---|
| 3,038,524 | 6/1962 | Bosomworth | 156/405 |
| 3,413,174 | 11/1968 | Porter | 156/406 |
| 3,600,252 | 8/1971 | Henley et al. | 156/406 |
| 3,795,563 | 3/1974 | Enders et al. | 156/406 |
| 3,923,390 | 12/1975 | Susko | 353/95 |
| 3,974,953 | 8/1976 | Klose | 226/189 |
| 4,222,811 | 9/1980 | Enders | 156/406 |

*Primary Examiner*—John E. Kittle
*Attorney, Agent, or Firm*—Kemon & Estabrook

[57] ABSTRACT

A tire building machine servicer including carcass component supply rolls and a plurality of vertically aligned extensible servicer trays arranged to be pivotable into and out of servicing position with respect to the tire carcass being assembled on a tire building drum. Anyone of said servicer trays may be extended telescopically and then rotated about its pivot axis to permit the delivery extremity of said tray to interface tangentially with the surface of the tire carcass being built. In this manner, the web or strip of tire component is precisely oriented and confined, by guide means on said trays, to a point immediately adjacent to the tangential point of contact where said web or strip contacts the carcass being built. Following such assembly the servicer tray may be telescopically retracted and pivoted about its mounting axis thereby providing necessary clearance whereby another servicer tray may be brought into tangential interface with the tire carcass for the placement of another web or strip therefrom.

10 Claims, 13 Drawing Figures

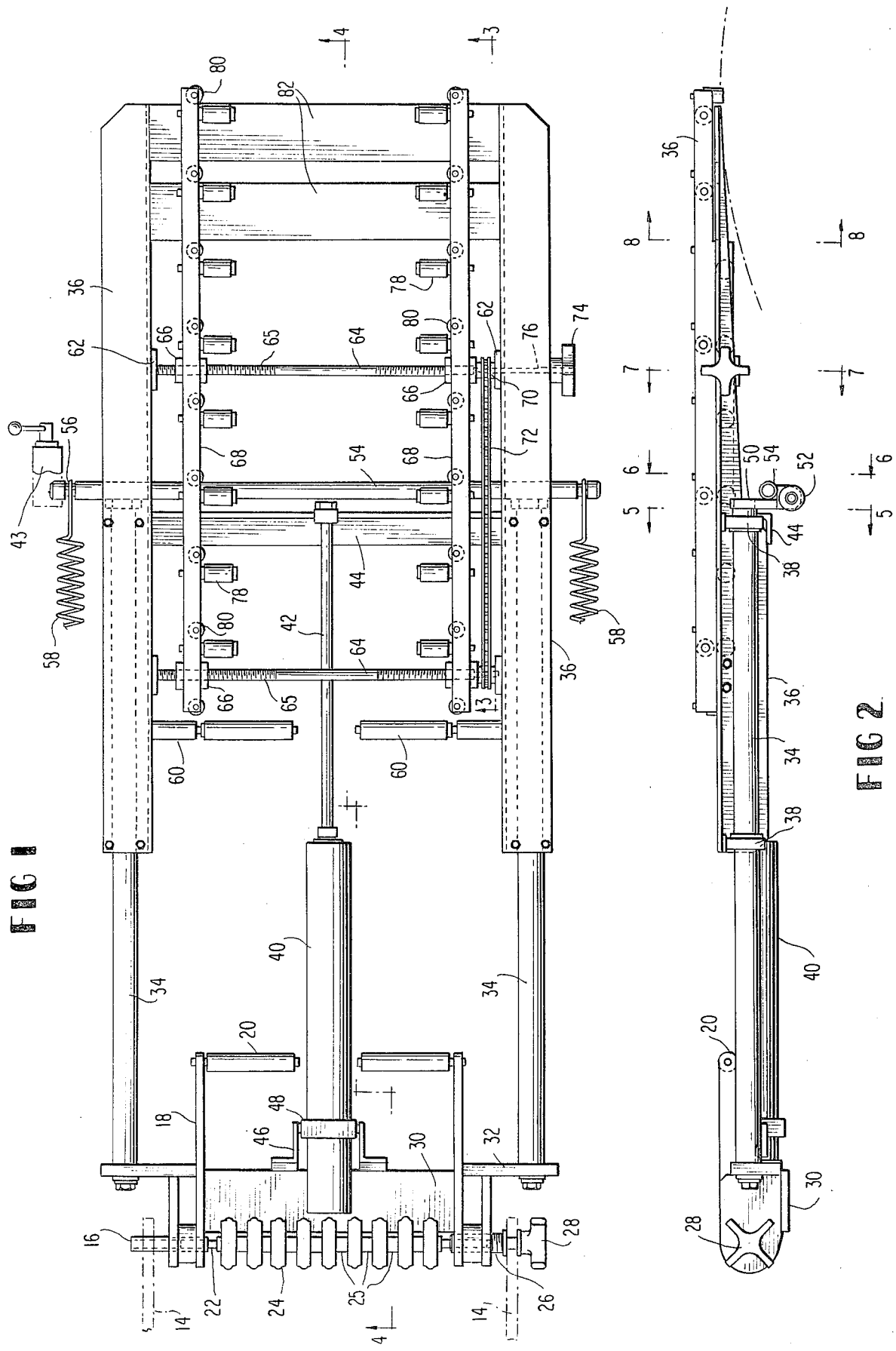

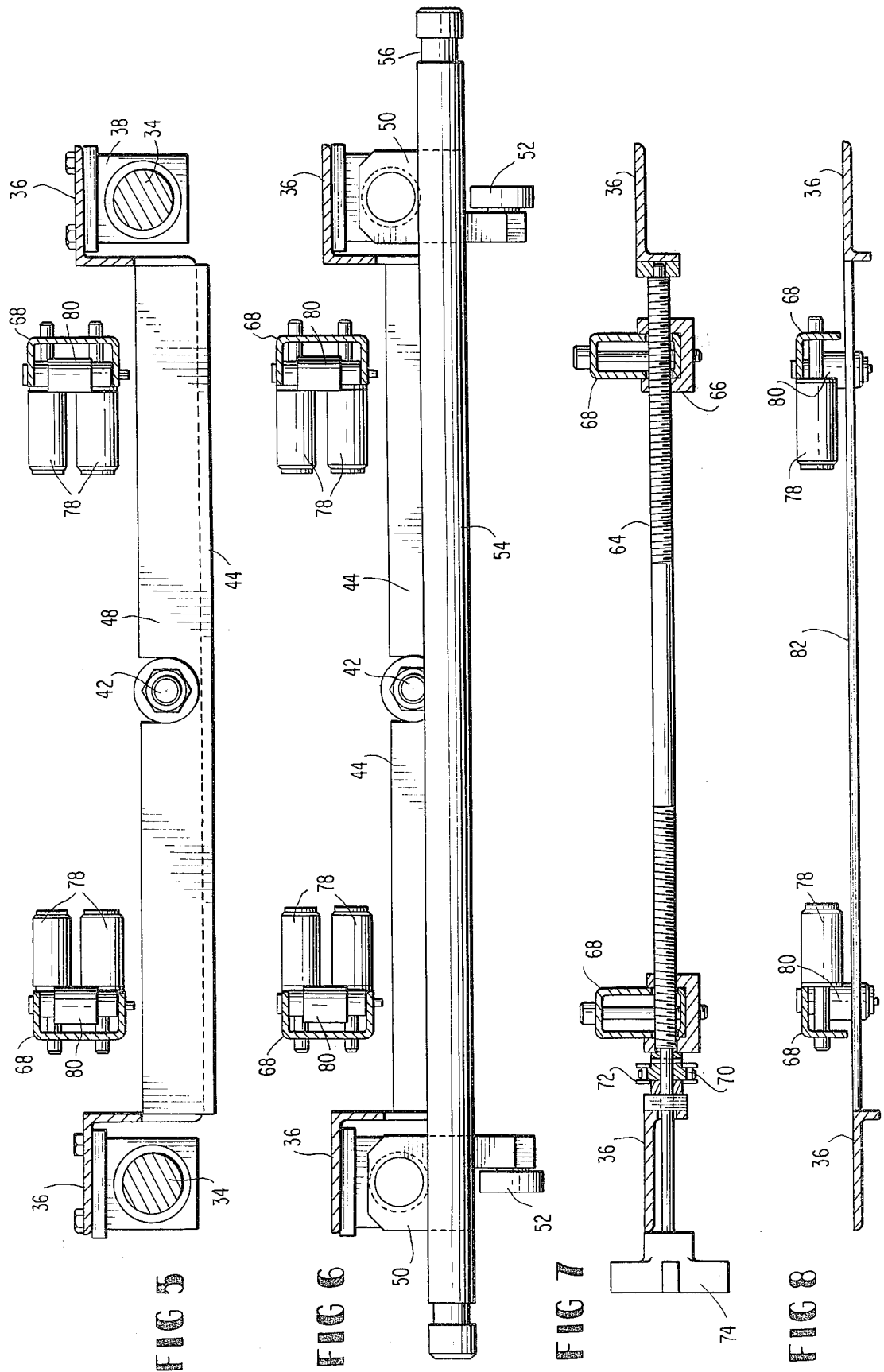

TIRE BUILDING MACHINE SERVICER

BACKGROUND OF THE INVENTION

The invention relates to a tire building machine servicer, and more particularly to an extensible servicer tray for the consistently accurate guiding and delivery of tire components to a tire carcass during the process of building said tire.

With the development of tire construction designs utilizing circumferential belts, tire manufacturers have been faced with the problem of assembling the narrow web or stripe-like belt members to the tire carcass assembly in an efficient yet precise manner. Assembly of such web or strip-like belt members in an off center or otherwise inaccurate manner may impart undesirable riding, wearing and/or handling characteristics to a tire so assembled.

Accordingly, numerous concepts and devices have been developed by the tire industry, their purpose being to guide or assist the tire builder in properly positioning the various tire components in their assembly of an incured tire carcass. One popular method is the use of an overhead projector, exemplified by U.S. Pat. No. 3,923,390, whereby predetermined guide lines are projected to the building drum and/or tire assembly surface, thereby providing the tire builder with reference or guide lines.

The typical tire assembly apparatus consists of a tire building machine containing a suitable drum or surface upon which the various tire components are assembled. Generally associated with the tire building machine is an apparatus referred to as the servicer. The servicer basically functions as a storage and dispensing apparatus for the various components required in building a specific type of tire. There are a variety of servicer designs, all having as their purpose the convenient delivery of tire components to the operator or the tire building machine. A common feature of such servicers is the use of pivoted extensions called ply pans whereby tire components, held by the servicer, are delivered to within the convenient proximity of the tire building machine operator. The prior art U.S. Pat. Nos. to Henley 3,600,252, dated Aug. 17, 1971, and Enders 3,795,563, dated Mar. 5, 1974 disclose such pans for stock delivery. The Henley patent discloses a tread stock delivery pan which is extensible while the belt and ply pans are fixed. The Enders patent discloses a tread stock delivery pan which is arranged to pivot into delivery position.

One notable deficiency of servicer/servicer pan assemblies heretofore known to the art was their propensity for human error resulting in off center or otherwise mis-aligned assembly of tire components, especially in regard to the tire belts.

SUMMARY OF THE INVENTION

The present invention is directed to an extensible servicer or guider for delivering ply or belt components to a tire carcass during the building of a tire.

A toroidal shaped tire carcass positioned on a suitable support may very readily have its center determined which then becomes the guide point in the positioning of plies or belts upon the tire carcass. The guider of the present application provides for very accurate guidance for the ply and belt components as they are delivered to the tire carcass as well as placing said components exactly on center of the carcass.

The present invention is directed to the concept of utilizing multiple outlets arranged one above the other in a somewhat stacked relation. This arrangement necessitates that the outlets or guiders have a tangential intercept with the carcass or building drum that is progressively closer to the operator as the number of outlets or servicers increases. The servicer or guider of the present invention which is extensible or telescoping enables the operator, when finished with one servicer or guider, to retract same, and then pivot it out of the way thereby enabling the next servicer or guider to contact the building drum or carcass in the same general tangential position as the prior servicer or guider.

BRIEF DESCRIPTION OF THE DRAWINGS

FIG. 1 is a plan view of an extensible servicer for guiding a belt or ply onto a tire carcass embodying the present invention;

FIG. 2 is a side elevational view of the extensible service guider shown in FIG. 1;

FIG. 5 is a vertical sectional view of the extensible service guider, the view being taken on the line 5—5 of FIG. 2;

FIG. 6 is a vertical sectional view of the extensible service guider, the view being taken on line 6—6 of FIG. 2;

FIG. 7 is a vertical sectional view of the extensible service guider, the view being taken on line 7—7 of FIG. 2;

FIG. 8 is a vertical sectional view of the extensible service guider, the view being taken on line 8—8 of FIG. 2;

DESCRIPTION OF THE PREFERRED EMBODIMENT

Figure 9:
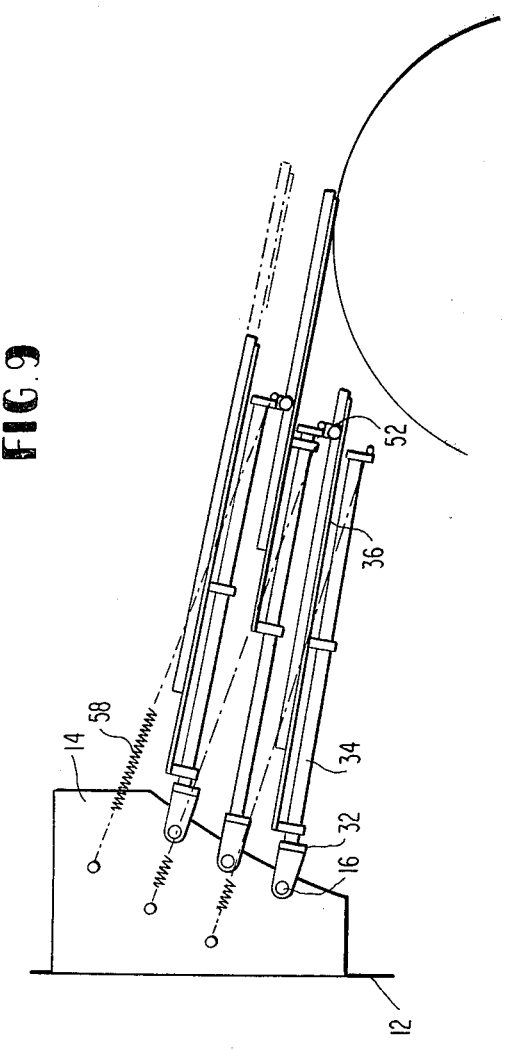
FIG. 9 is a side elevation schematic showing the relationship of multiple extensible servicer trays, installed on a servicer machine, in relationship to a tire carcass in its final assembly stage.
Figure 3:
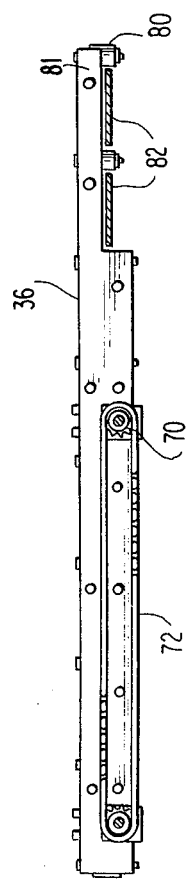
FIG. 3 is a vertical sectional view of the extensible service guider, the view being taken on line 3—3 of FIG. 1.

There is shown in FIGS. 1 and 9 an extensible servicer device or tray having a support member 12 that has secured thereto brackets 14 that carry a plurality of vertically spaced stub shafts 16 for the mounting of a plurality of vertically aligned trays. The inner end portions of the shafts 16 have secured thereto by any suitable means cantilever arms 18 which have rollers 20 mounted in the ends thereof. The inner ends of the shafts 16 are drilled to receive an elongated rod 22 which has mounted thereon a plurality or of roller elements 24 which have spacer collars 25 interposed between adjacent rollers. One of the shafts 16 is provided with an adjustable threaded bearing 26 which upon the rotation of the hand wheel 28 enables the arms 18 and the extensible servicer structure attached thereto to be moved with respect to the brackets 14 so as to center the extensible servicer tray relative to the circumferential center of the tire carcass.

The arms 18 have interposed there between and secured thereto a web member 30 to which plate members 32 and arms 18 are secured. The plate members 32 have secured thereto frame rails 34 in spaced parallel relation to one another and one leg portion of an angle shaped frame member 36 is slidably mounted on each of said rails. The bottom surface of said frame members 36 are provided with spaced collars 38 which encase the frame rails 34 and slidably retain the frame member 36 in proper alignment with said rails.

The web member 30 has mounted thereon one end of an air cylinder 40 that is provided with a piston rod 42. The free end of the piston rod 42 is connected to an angle plate 44 the outer ends of which are secured to the bottom surface of the frame member 36 so as to move said frame member over the frame rails 34 upon the extension and retraction of the piston rod 42 within the cylinder 40 which is controlled by suitable control means 43. The web member 30 has secured thereto trunnion brackets 46 which carry a cylinder trunnion mount 48, the upper surface of said cylinder trunnion mount being below the upper surfaces of the rollers 20 and 24.

The ends of the frame rails 34 each have a plate member 50 secured thereto which plate member terminates in a depending leg having a roller 52 mounted thereon. The plate members 50 also have secured, superjacent the rollers 52, a transverse bar 54, the ends of which project outwardly beyond the frame member 36. The end portions of the bar member 54 are formed with grooves 56 which are adapted to receive one end of a spring member 58 with the other end of the spring member being connected, by a suitable clamp, to the arcuate shaped brackets 14. The inner legs of the angle shaped frame members 36 at the end adjacent the cylinder 40, are provided with inwardly extending roller shafts upon which suitable rollers 60 are mounted.

The inner legs of the frame members 36 are provided with adjustable screw bearings 62 which are adapted to receive the ends of rods 64. The rods 64 have threaded sections 65, said alternate threaded sections being of opposite hand and which engage nut members 66 which are of corresponding thread hand and are carried by guide rails 68. One end portion of each rod 64 has a suitable sprocket 70 secured thereto, FIG. 7, about which is entrained a sprocket chain 72. One of the rod members 64 as well as one of the sprockets 70 is connected to a hand wheel 74 by means of an extension 76 of rod 64. Thus, upon rotation of said hand wheel one of the sprockets 70 will be rotated and through the sprocket chain 72 will rotate the other sprocket so that the threaded rods 64 will be rotated thereby moving the guide rails 68 by means of the nut members 66 towards and away from one another dependent upon the direction of rotation of the hand wheel 74.

The guide rails 68, that are carried by the nut members 66, are of hollow rectangular configuration in cross section. The rails 68 have mounted on the inner faces thereof a plurality of pairs of vertically aligned rollers 78 that are arranged in spaced relationship with one another. The rollers 78 are mounted at spaced intervals throughout the length of each guide rail. The inner faces of the guide rails 68 are formed with spaced apertures adjacent each pair of rollers 78 and each aperture is provided with a vertically disposed roller 80 that is mounted on pins extending through the top and bottom faces of said guide rails.

Figure 4:
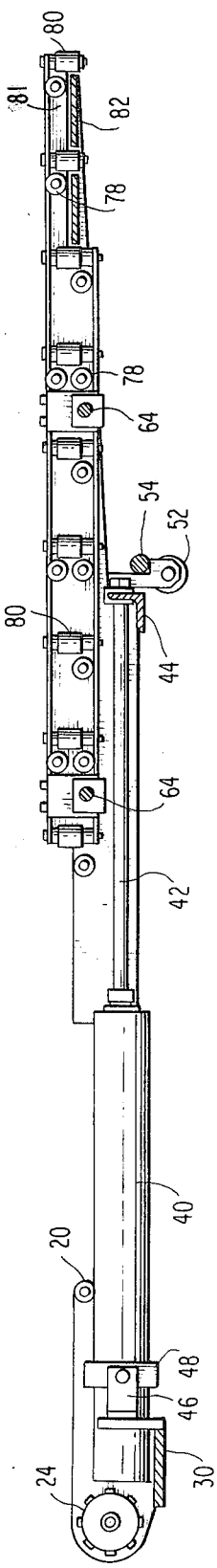
FIG. 4 is a longitudinal sectional view of the extensible service guider, the view being taken on line 4—4 of FIG. 1.
Figure 9B:
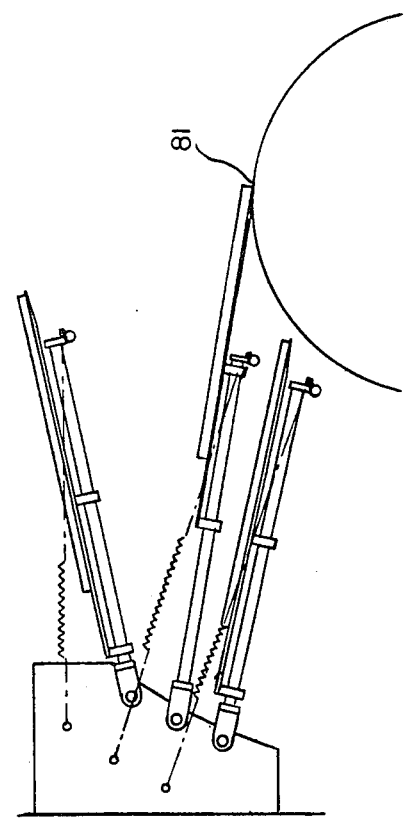
FIGS. 9A, 9B and 9C disclose in more specific detail the manner in which the reduced end portions of the frame members of the servicer trays engage the tire carcass in a tangential path in the delivery of belt material from the trays to the tire carcass.
Figure 10:
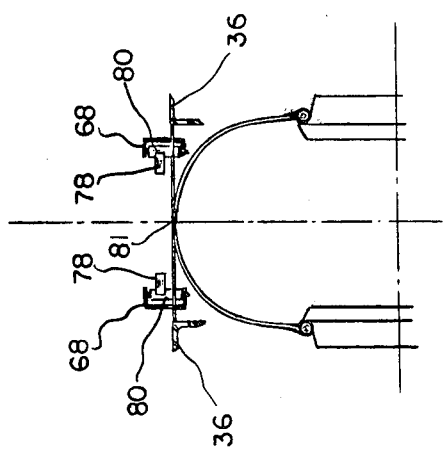
FIG. 10 is an end view of an extensible servicer tray showing the tangential relationship with the cross-section of the tire carcass.
Figure 9A:
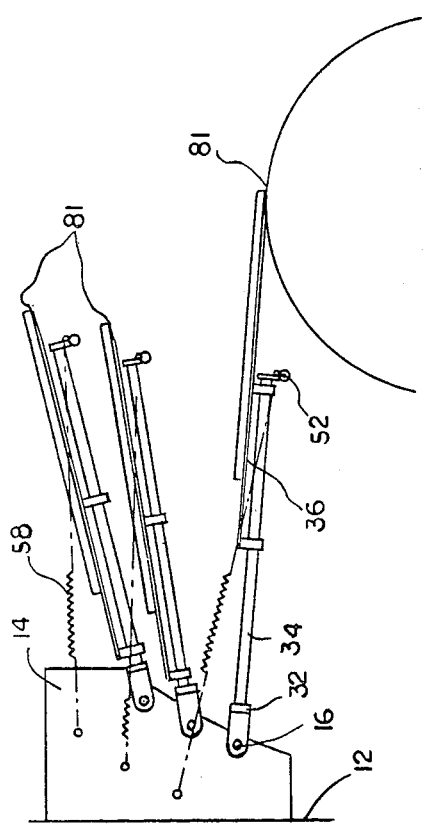
Figure 9C:
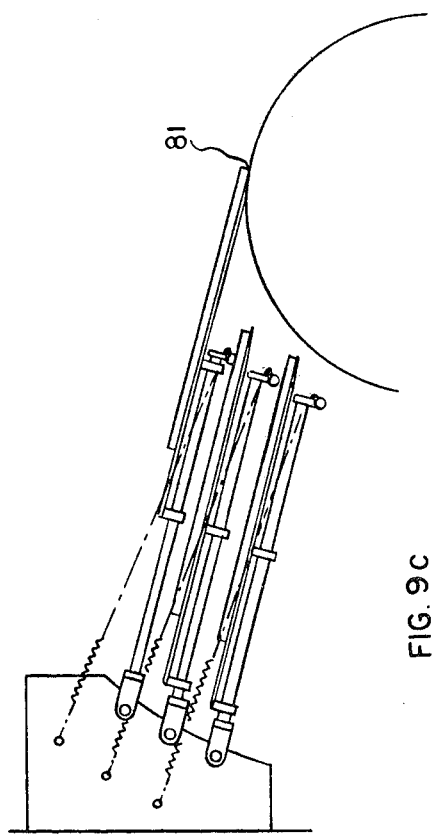

The vertical rollers 80 are positioned so as to be substantially within the hollow rectangular guide rails 68 while the horizontal rollers 78 project inwardly towards the opposite guide rails. The vertical rollers 80 are in close proximity to the horizontal rollers 78 with the vertical rollers overlapping the spacing between the horizontal rollers. The outermost or forward end of the angle shaped frame members 36 are gradually reduced in thickness to wherein they are tapered to a reduced end portion 81, FIG. 4. The lowermost roller of each pair of rollers 78 has been eliminated so that said tapered or reduced end portion 81 is provided with a single roller 78 with an adjacent vertical roller 80. The reduced end portion is provided with brace or guide members 82 which are adapted to support and guide the belt material moving beneath the single roller 78 and against the vertical rollers 80 as the belt material moves onto the tire carcass in a tangential path. As illustrated in FIGS. 9 and 10, the reduced or tapered end portion 81 of the frame members 36 are positioned in close proximity to the tire carcass so that the center of the belt material will coincide with the center of the tire carcass. As shown in FIGS. 9 and 10, the reduced end portion 81 is substantially supported in a tangential path or plane upon the tire carcass to facilitate the delivery of the belt material from the frame members 36 onto the tire carcass while maintaining the center of the belt material in alignment and registry with the center of the tire carcass.

In the use of the extensible servicer of the present invention it is usually one of several servicer trays that are pivotally mounted upon the bracket 14 in a superimposed or stacked relation with each servicer tray being adapted to pivot about the stub shafts 16 mounted in the angle brackets 14. Each servicer tray is adapted to receive a belt from a supply roll carried by the support member 12, and to deliver said belt to a tire carcass that is being built. It is essential that the delivery end of the tray be positioned with respect to the tire carcass so as to interface tangentially with the surface of the carcass. Thus, if the operator notices that the belt or strip of tire component from the supply roll is not in proper alignment as it moves over the rollers 24 and frame member 36, the hand wheel 28 can be rotated to adjust the alignment of the belt. In addition the rotation of the hand wheel 74 will cause the guide rails 68 to move so as to confine and precisely orient the web or belt moving over the servicer tray.

The tire belt material that is being supported by the frame rails 34 and frame members 36 as it is being withdrawn from its source of supply and directed onto the tire carcass will have its edge portions drawn between the horizontally disposed rollers 78 while at the same time engaging the vertical rollers 80 that are carried by the guide rail members 68. In the event that the guide rails 68 have to be adjusted laterally with respect to the frame members 36, so as to ensure the proper alignment of the belt material with the tire carcass, the rotation of the hand wheel 74 will cause said guide rails to be moved in a lateral direction toward or away from one another by means of the threaded rods 64 and the sprockets 70 and sprocket chain 72. Once the frame member 36 and the guide rails 68 have been properly adjusted the belt material may then be withdrawn by the operator from the source of supply and directed onto the tire carcass whereupon the tire carcass will be rotated for a distance of 360° after which the belt material will be severed and the frame member 36 can be retracted onto the frame rails 34 upon the actuation of a suitable control means 43 which controls the delivery of air to the cylinder 40 for retracting the piston and piston rod 42. At the time of severing the belt material and the actuation of the control means 43 to cause the frame member 36 to retract on the frame rails 34 the operator will push the frame member 36 downwardly against the action of the spring member 58 which movement tends to force the frame member to assume a downwardly inclined position where it is maintained in said position under the action of the spring member 58.

The next adjacent servicer tray carried by the bracket 14 is then manually engaged by the operator and same is pulled downwardly from its upwardly inclined position to a position wherein the belt material being withdrawn from the source of supply and moved over the frame member 36 will be directed onto the tire carcass in the same manner as the belt material was withdrawn from the first mentioned frame member. In the event that the first frame member 36 has not been depressed sufficiently to enable the second frame member to be drawn outwardly and downwardly into proper positioning for delivering the belt material to the tire carcass the rollers 52 of the second frame member will engage the first mentioned frame member 36 and force it downwardly against the spring action. At the time of pulling the servicer tray downwardly the operator will actuate said control means which causes the piston rod 42 to extend and then move the frame member 36 along the frame rails 34. This will permit the operator to precisely orient the belt or web of material for delivery to the tire carcass so that the belt or web will move off of the frame member 36 at the tangential point of contact of the tire carcass for the proper orientation of the web or strip upon the tire carcass.

Once the belt material carried by the several frame members has been deposited upon the tire carcass and the frame members returned to their retracted and downwardly inclined position the operator will then withdraw from a third frame member the conventional tread stock to be applied to the tire carcass. The manner of pivotly mounting the frame members upon the bracket 14 and having said frame members maintained in either an upwardly inclined or downwardly inclined position under the action of the spring members 58 enables the belt material to be withdrawn from the frame members and positioned upon the tire carcass each time at a point of tangency with respect to said tire carcass. This concept particularly enhances the capability of the operator in properly positioning the belt material upon the tire carcass so as to be certain that the center line of said belt material coincides with the center line of the tire carcass that is being built. This arrangement overcomes the conicity problem that originates in the building of tires and which problem tends to result from the improper positioning and alignment of the belt material upon the tire carcass. Such precise alignment of belt materials will also greatly alleviate lateral force variations in tire performance and resulting from improper alignment of belts or plys.

Thus, each servicer tray of the present invention maybe extended under the action of the cylinder 40 and piston 42 to wherein the end of the frame members 36 and the last rollers 80 would be positioned substantially over the tire carcass with the belt or web of material being guided to a point immediately adjacent to the tangential point of contact with the tire carcass being built.

Although the foregoing description is necessarily of a detailed character, in order that the invention may be completely set forth, it is to be understood that the specific terminology is not intended to be restrictive or confining, and that various rearrangements of parts and modifications of detail may be resorted without departing from the scope or spirit of the invention as herein claimed.

I claim:

1. An extensible servicer device for supplying belt material to a tire carcass being built, comprising, a support member having brackets secured thereto;
   a pair of frame rails arranged in spaced parallel relation to one another with frame members slidably mounted on said rails, said frame members having a receiving and a delivery end;
   means pivotally connecting an end of said rails to said brackets;
   a cylinder and piston rod connected to said frame members for advancing said frame members toward the other end of said rails and to retract said frame members towards the first named end of said rails;
   said frame members receiving said belt material for delivering same to said tire carcass; and
   the delivery end of said frame members tapering to a reduced end portion having guide members mounted thereon subjacent the top surface of said frame members, said guide members supporting said belt material and precisely orienting the center of said belt material with the center of the tire carcass contemporaneous with delivering the belt material in a tangential path to the point of contact with the center line of the tire carcass.

2. An extensible servicer device as set forth in claim 1 wherein said frame members have positioned therebetween and secured thereto a pair of adjustable guide rails having a receiving and a delivery end with the delivery end of said guide rails overlying said guide members.

3. An extensible service device as set forth in claim 2 wherein said guide rails include a plurality of vertically disposed rollers and a plurality of horizontally disposed rollers mounted thereon to engage the side edges of the belt material.

4. An extensible servicer device as set forth in claim 1 wherein said guide rails includes a pair of hollow rectangular shaped members formed with spaced apertures on one face thereof with vertically disposed rollers projecting from said apertures.

5. An extensible service device as set forth in claim 4 wherein said hollow rectangular shaped members have spaced pairs of horizontally disposed rollers mounted thereof with said rollers being arranged in spaced vertical relation to one another to define passageways for the edge portions of the belt material.

6. An extensible servicer device as set forth in claim 3 wherein said guide rails are provided with spaced nut members engageable with threaded rods carried by said frame members for adjusting said guide rails with respect to one another.

7. An extensible servicer device as set forth in claim 6 wherein said threaded rods have sprockets mounted thereon with a chain entrained there about and a hand wheel for rotating said chain to move said nut members and guide rails with respect to said frame members.

8. An extensible servicer device as set forth in claim 1 wherein said frame members are provided with inwardly projecting rollers for guiding the belt material onto said guide means.

9. An extensible service device as set forth in claim 1 wherein said frame rails are connected by a transverse bar member with spring means connected to said bar member and said bracket.

10. An extensible service device as set forth in claim 9 wherein said frame rails and bar member have a plate member with depending rollers secured thereto.

* * * * *